UNITED STATES PATENT OFFICE.

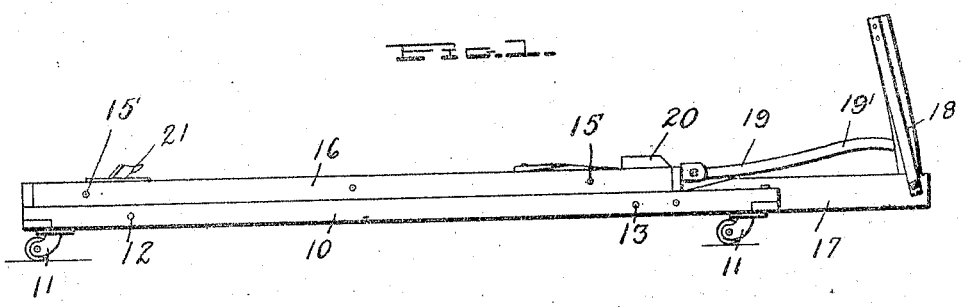
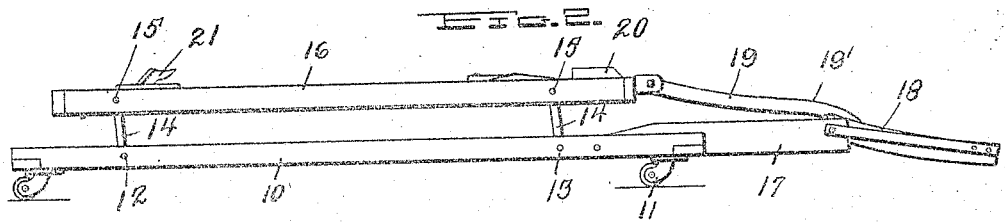
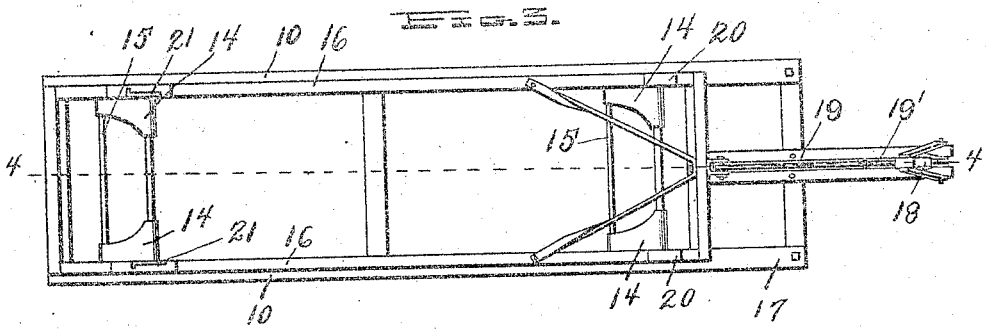
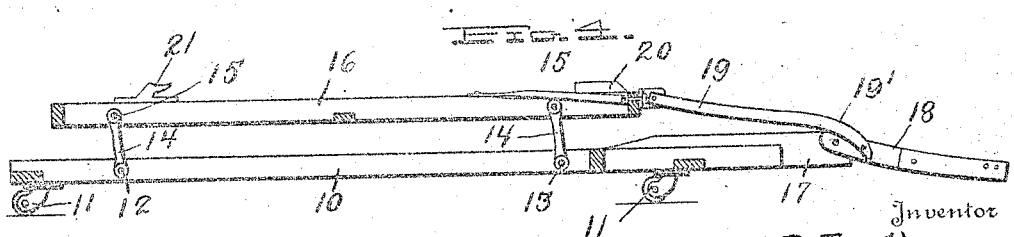

ALVA R. TAYLOR, OF VERNON, TEXAS.

AUTOMOBILE-JACK.

1,203,811.   Specification of Letters Patent.   Patented Nov. 7, 1916.

Application filed November 2, 1914. Serial No. 869,868.

*To all whom it may concern:*

Be it known that I, ALVA R. TAYLOR, a citizen of the United States, residing at Vernon, in the county of Wilbarger, State of Texas, have invented certain new and useful Improvements in Automobile-Jacks; and I do hereby declare the following to be a full, clear, and exact description of the invention, such as will enable others skilled in the art to which it appertains to make and use the same.

This invention relates to improvements in jacks and particularly to jacks for lifting automobiles.

One object of the invention is to provide a device of this character which is simple in construction, and which will be effective in its operation to properly support an automobile above the floor to permit necessary repairs thereto.

Another object is to provide a device of this character of such construction that the same can be operated with the expenditure of a small amount of energy and which will be held in elevated position without the use of pawl and ratchet locking means or similar devices.

Other objects and advantages will be apparent from the following description when taken in connection with the accompanying drawings.

In the drawings: Figure 1 is a side elevation of my improved automobile jack showing the same in lowered position, Fig. 2 is a similar view showing the same in elevated position, Fig. 3 is a top plan view of the device in the position of Fig. 1, and Fig. 4 is a vertical longitudinal sectional view through the device in the position shown in Fig. 2.

Referring particularly to the accompanying drawing, 10 represents a suitable frame which is adapted to rest on the floor or is supported by suitable caster wheels 11. Extending transversely of the frame and journaled in the sides thereof at the front and rear ends are the shafts 12 and 13. Each of these shafts carries a pair of upwardly extending arms 14 which are pivotally connected with the transverse rods 15 mounted in the opposite ends of a smaller frame 16 disposed above the first frame. Extending forwardly from one end of the base frame 10 is a tongue 17 to the outer end of which is pivotally connected an operating lever 18. Pivotally connected at its opposite ends to the forward end of the frame 16 and to the lever 18 above its pivot is a link 19. When the lever 18 is in vertical position the frame 16 rests on the frame 10, but when the lever is moved on its pivot away from the frame, the frame 16 will be raised by means of the link 19, the shafts 12 and 13 turning in their journal mountings and supporting the frame 16 by means of the arms 14. The end of the link 19 which is pivotally connected to the lever 18 is forwardly and downwardly curved, as at 19' so that when the lever 18 is thrown down until it is in approximately horizontal position the pivotal connection of the link will be below the pivotal mounting of the lever, thus preventing the lever from being drawn into an upright position when the weight of the automobile is placed on the frame 16. The forward portion of the frame 16 carries the blocks 20 which are adapted to support the front axle of the automobile while the rear end of the frame carries the vertically extending members 21 which have their forward ends undercut to provide recesses so that the bracing rods of the rear axle will be escaped when said axle rests on the said members 21.

What is claimed is:

1. An automobile jack comprising a wheeled frame, transverse shafts mounted in the ends of the frame, radially extending arms mounted on the shaft, a supplemental frame pivotally mounted on the upper ends of the said arms, an extension at one end of the wheeled frame, a lever pivotally mounted in the end of the extension, a link pivotally connected at one end to the adjacent end of the supplemental frame, and at its other end to the lever, the lever end of the link being downwardly curved whereby it will pass below the pivot point of the lever when said lever is moved into a horizontal position, blocks arranged on the front end of said supplemental frame for supporting the front axle of a vehicle, and upstanding members disposed on the rear end of said frame for supporting the rear axle of the vehicle, and having their forward ends undercut to provide recesses for the reception of the bracing rods of the rear axle.

2. An automobile jack comprising a main frame, a supplemental frame, means to vary the distance between said frame and connecting the frames, and rear axle supports carried by the supplemental frame and each consisting of an upstanding member having a concave upper surface to receive the body of the axle and provided with undercut portions for the reception of the bracing rods of such axle.

In testimony whereof, I affix my signature, in the presence of two witnesses.

ALVA R. TAYLOR.

Witnesses:
ALONZO THURMAN,
E. S. FLIPPO.